United States Patent [19]

Merkel

[11] 4,348,657
[45] Sep. 7, 1982

[54] METHOD FOR TRANSMITTING BINARY SIGNALS OVER A FOREIGN WIRING NETWORK

[75] Inventor: Willi Merkel, Albstadt, Fed. Rep. of Germany

[73] Assignee: Fritz Fuss Kom. Ges. Elektrotechnische Fabrik, Albstadt, Fed. Rep. of Germany

[21] Appl. No.: 158,878

[22] Filed: Jun. 12, 1980

[30] Foreign Application Priority Data

Jun. 12, 1979 [DE] Fed. Rep. of Germany ....... 2923716

[51] Int. Cl.³ .............................................. H04B 3/54
[52] U.S. Cl. ................................ 340/310 R; 328/127; 340/538
[58] Field of Search ........ 340/310 R, 310 A, 310 CP, 340/538; 328/127; 371/67, 69; 307/3, 149

[56] References Cited

U.S. PATENT DOCUMENTS

| | | | |
|---|---|---|---|
| 2,515,553 | 7/1950 | Flowers | 340/310 R |
| 2,773,181 | 12/1956 | Singel | 340/310 R |
| 3,153,176 | 10/1964 | Clay | 340/310 R |
| 3,806,876 | 4/1974 | Kniel et al. | 340/310 R |

Primary Examiner—James J. Groody
Attorney, Agent, or Firm—Fleit & Jacobson

[57] ABSTRACT

A method for transmitting binary signals having two logical states over a foreign wiring network, in particular for transmitting signals between structural elements of an alarm installation over an electrical supply wiring network. At least one of the two logical states of the binary signals is converted into a particular frequency, provided to the foreign network, and selected on a receiving end by filtering devices. The method includes the steps of recovering the binary signals on the receiving end, and passing the recovered binary signals through first and second differentiating networks which form an interference trap to identify and block interference pulses present in the signal.

6 Claims, 3 Drawing Figures

METHOD FOR TRANSMITTING BINARY SIGNALS OVER A FOREIGN WIRING NETWORK

The invention concerns a method for transmitting binary signals over a foreign wiring network, and in particular a method for transmitting signals between the structural elements of an alarm installation over the electrical supply wiring network.

Electronic alarm systems for industrial installations or dwellings often consist of several separate structural elements which are functionally interconnected. In such a case signal sources planned in advance at different places can furnish a signal to a central connecting device, upon which the latter activates one or more alarm mechanisms.

In expensive systems of this kind the functional connection of such structural elements is provided by the common electrical supply wiring network, whereby the laying of special lines is greatly obviated. This is a significant advantage as the number and distance of the areas to be superintended grows.

In such kinds of alarm systems the structural elements which are to be brought into functional contact with each other are simply connected to the nearest electrical outlet, to which they furnish particular signals or from which they receive such signals.

The signals mentioned can be, for example, tone frequency pulses which are transmitted into the network via appropriate coupling devices. Obviously, energy can also be taken from the outlet at the same time, in order to charge a battery associated with the particular structural element. In this way the data transmission faculty of the system remains ready for operation even when the network is disconnected.

In expensive systems, binary coded signals, that is, groups of pulses, can also be transmitted, in order, for example, to be able to identify an alarm signal from a specific signal source. In this kind of arrangement, one of the logical states (generally the "1" state) is assigned a fixed frequency, while the absence of this frequency represents the logical state "0". Alternatively to this, a first fixed frequency can be assigned to one of the two logical conditions, and a second fixed frequency to the other of the two logical states. The actual transmission of data takes place, then, through the successive transmission of one fixed frequency and intervening pauses, or through the alternating transmission of a first or a second fixed frequency.

As practical experiences with such systems have shown, the requisite reliability of data transmission is not guaranteed, especially when binary signal groups are to be transmitted over an interference-ridden supply wiring network.

It is the task of the invention to create a method for transmitting binary signals over a foreign wiring network, in particular for transmitting signals between the structural elements of an alarm installation over the electrical supply wiring network, and one which ensures a particularly reliable exchange of data even when the network is plagued with interference.

To this end it is suggested, according to the invention, that the binary signals recovered at the receiving end pass through a first and a second RC differentiating network, whose resistors are bridge in each instance by a diode which is connected in the direction opposite that of the one in the other differentiating network.

It is additionally suggested, as appropriate to a preferred configuration of the invention, that the bits of the binary signals recovered at the receiving end be checked several times in succession to see if they are present, and that the frequency of their presence be taken as the basis for a decision as to their authenticity.

A notion which is fundamental to the invention rests on the recognition that the duration of the most frequent interference in the transmission network amounts to less than about 300 microseconds. In assuming a beat frequency of 1 kHz for the binary data, the transmission time for one bit is at least three times longer than the time of a network interference. At a beat frequency of 50 Hz time ratios of 60-to-1 and better result. In this way it is possible to identify interference pulses arising at the receiving end as such, and to prevent them from being passed on into an evaluation connection.

Further details may now be explicated in regard to a preferred configuration and with regard to the appended drawings. These latter drawings are described as follows.

Figure 1:
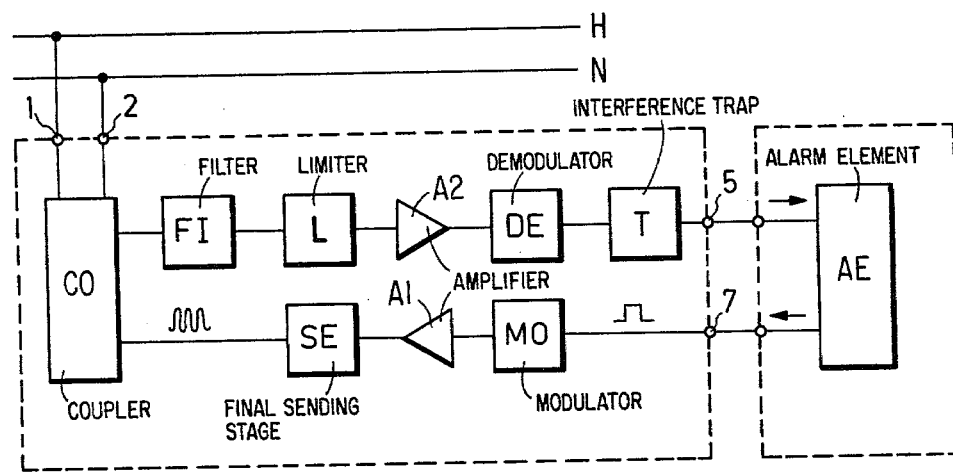
FIG. 1 shows a block diagram of a transmission system corresponding to a preferred configuration of the invention.

With regard to FIG. 1, an alarm element (AE) belonging to an alarm installation consisting of several alarm elements can supply digital data in the form of pulses or pulse groups to a modulator (MO) through a connecting terminal (7). The modulator (MO) furnishes a specific fixed frequency to an amplifier (A1) for the duration of a pulse. The amplifier (A1) relays this to the final sending stage (SE). The frequency signal gets, by way of example, to the hot (H) and neutral (N) wires of a building's electrical supply wiring network via a coupler (CO) and connecting terminals (1) and (2).

Frequencies in the range of from about 20 kHz to 500 kHz are suitable for the transmission of this kind of data. In such cases the assignment can be chosen in such a way that the logical "1" of the binary data is assigned to the fixed frequency mentioned, while the logical "0" is associated with the absence of such a frequency. It can, however, be advantageous to carry out transmission with two different fixed frequencies, whereby logical "0" is assigned to a first fixed frequency and logical "1" to a second. The frequency signals mentioned arrive at the couplers of all the other alarm elements in the system over both the hot and neutral lines.

Should frequency signals from another alarm element arrive at the coupler (CO) of the connection shown in FIG. 1, these then find their way into a filter (FI) and from this to a limiter (L). The signals are fed into a demodulator (DE) through an amplifier (A2); the demodulator converts these back into a logical "0" or a logical "1". The recovered binary data are fed through an interference trap (T) and connecting terminal (5) for further processing.

Figure 2:
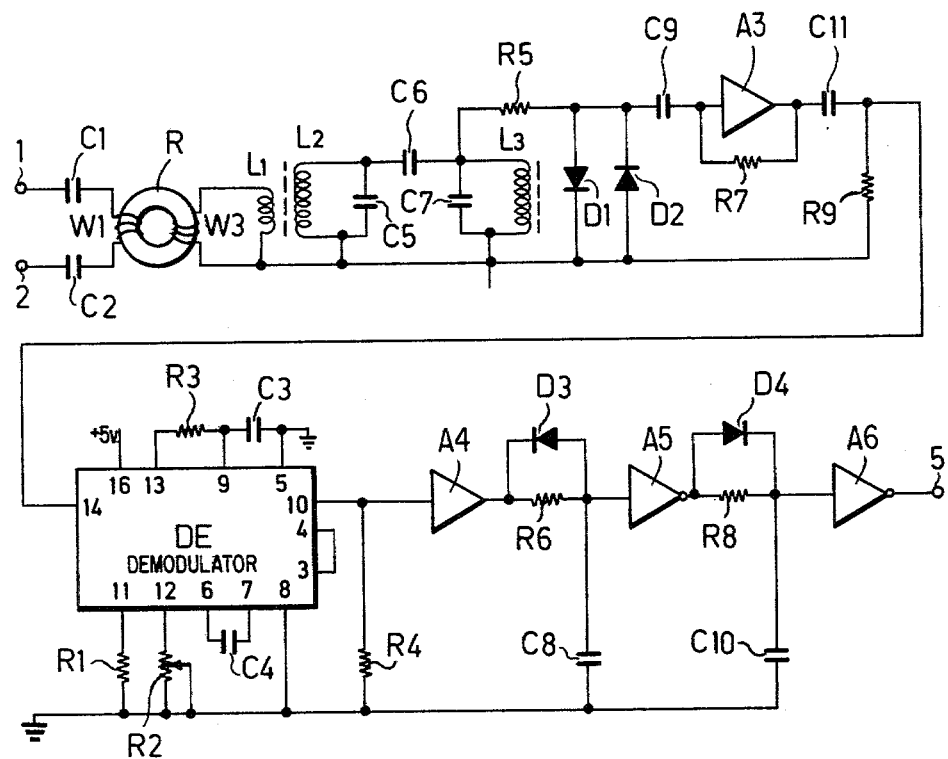
FIG. 2 shows a detailed schematic circuit diagram for the receiving part of the system shown in FIG. 1.

With regard to FIG. 2, a detailed schematic of the receiving part shown in FIG. 1 is represented, in which the principles behind the invention are applied. The frequency signals which arrive over the foreign wiring network pass through connecting terminals (1) and (2) as well as through capacitors (C1) or (C2) of the same value into winding (W1) of a toroid core (R) made from magnetizable material. The signal induced from winding (W1) is taken up by the further winding (W3) and is fed into the coupling inductor (L1) of a filter. In transmission systems working with only one fixed frequency the filter can, for instance, be a single parallel circuit tuned to this fixed frequency.

In the configuration shown here a transmission system with two fixed frequencies is adopted; a common band filter is assigned to them. This filter consists of a first parallel oscillating circuit formed by inductor (L2) and capacitor (C5) and a second parallel circuit formed by inductor (L3) and capacitor (C7). Both parallel oscillating circuits are coupled together through capacitor (C6). By appropriately tuning both oscillating circuits, transmission behavior of equal value is achieved for both fixed frequencies. In the case of a practical attempt these amount to 280±2.75 kHz.

Althrough frequencies lying outside the transmission range of the filter are heavily attenuated, this does not preclude heavy interference on the output side of the filter, since the level of such interference can be significantly greater than the level of the desired frequency signals. In order to appropriately limit this interference, the output side of the filter is joined, through a resistor (R5) of sufficiently high ohmage to deattenuate the filter, with two diodes (D1) and (D2) connected in opposite directions. These respond at about 0.7 V and appropriately limit both positive and negative signals. The limited signals find their way through capacitor (C9) to the input of a negative feedback amplifier (A3) and from this through capacitor (C11) to the input of the demodulator (DE) as well as to a grounded resistor (R9) for impedance matching.

When the demodulator (DE) receives the first fixed frequency, this is converted into a logical "0" at its output, and when it receives the second fixed frequency, this is converted into a logical "1" at its output.

The demodulator (DE) is preferably a commercial semiconductor module of the PLL (phase-locked-loop) type, whose construction and manner of operation are known and described, for example, in *Electronics Development* ["Elektronik Entwicklung"], no. 10 (1978), pages 475 to 479. In the configuration shown here, type CD 4046 A, described in the latter reference, is used.

In the application foreseen here, pin (8) of the module is connected to ground, while pin (16) receives a positive operating voltage of about +5 V. The entering frequency signal is connected to pin (14), and the recovered binary data in the form of square wave pulses are picked up from pin (10). Pins (3) and (4) are bridged directly, and pins (6) and (7) are bridged through capacitor (C4). Pin (11) is grounded through fixed resistor (R1) and pin (12) is grounded through variable resistor (R2). Pin (5) is grounded directly, and pin (9) is grounded through capacitor (C3). Resistor (R3) is connected between pins (9) and (13).

Capacitor (C4), connected between pins (6) and (7), serves, together with (R1), to tune the frequency of the demodulator and has a value in the picofarad range. In a proven test construction, data transmission took place with a first frequency of 277.25 kHz and a second frequency of 282.75 kHz, from which a midband frequency of 280 kHz resulted for the band filter and the demodulator.

For matching purposes the output of the demodulator (DE) is connected to ground through resistor (R4). The retrieved binary data is provided to the input of the amplifier (A4) in the form of square wave pulses. The output of this amplifier (A4) is connected with the first differentiating network, which consists of a resistor (R6) in the longitudinal branch and a capacitor (C8) in the transverse branch. A diode (D3) is connected in parallel with resistor (R6); the diode's cathode is oriented toward the output of the amplifier (A4). This differentiating network is followed by a further amplifier (A5) whose output is connected to a second differentiating network which consists of a resistor (R8) in the longitudinal branch and a capacitor (C10) in the transverse branch. Resistor (R8) is also in parallel with with a diode (D4), but here the anode of the diode (A4) is oriented toward amplifier (A5). The time constants of both differentiating networks are preferably the same and are roughly in the vicinity of 100 microseconds. The second differentiating network is followed by an amplifier (A6) from whose output the binary signals are fed through connecting terminal (5) into the alarm element (AE), in which evaluation of the signals takes place.

Figure 3:
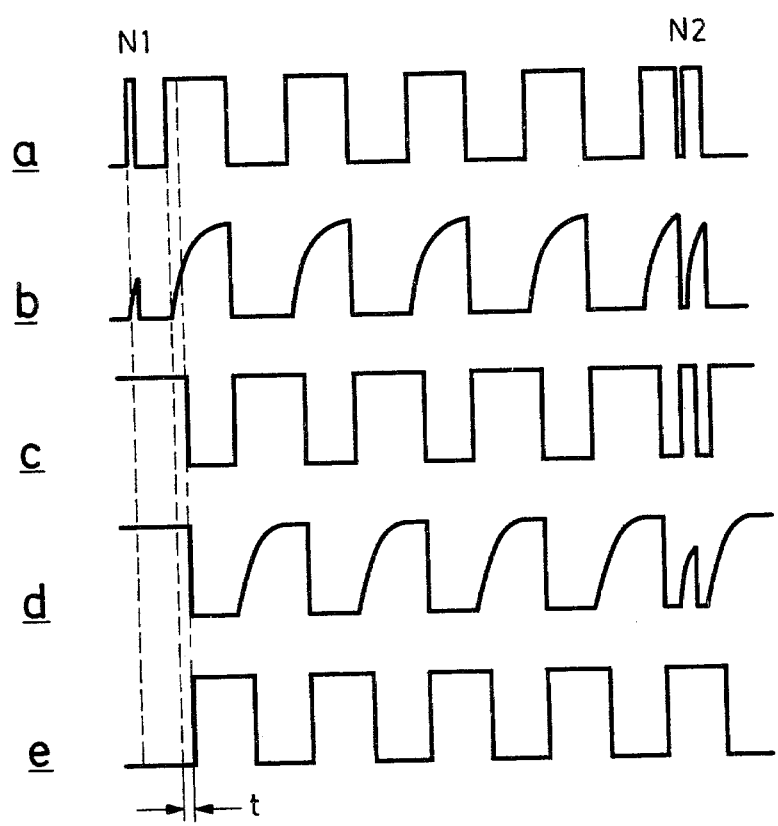
FIG. 3 shows various stages in the treatment of binary signals recovered at the receiving end as this is accomplished by differentiating treatment according to the invention.

With regard to FIG. 3, line (a) shows a signal group appearing at the output of amplifier (A4) or at the input of the first differentiating network, while line (b) reflects the same signal group at the output of the first differentiating network. Comparison of lines (a) and (b) shows that the rise slopes of all pulses are delayed by the first differentiating network, but the decay slopes are not; all of this is effected by diode (D3). Through the operation of amplifier (A5) which exhibits a response threshold, the rise slopes, which are curved in close conformity to an exponential function, are reformed into steep slopes and the polarity of the signals is reversed, as represented in line (c).

The decay slopes of the pulses are delayed by the second differentiating network, while the rise slopes are immediately passed through, which is effected by diode (D4). Line (d) illustrates how the square wave pulses produced at the output of amplifier (A5) look after the second differentiating network. Amplifier (A6), which likewise exhibits a response threshold, straightens out the decay slopes of the pulses which had been curved to the shape of an exponential function, and effects yet another inversion of the signals. Line (e) shows the pulse groups at the output of amplifier (A6).

As a comparison of lines (a) through (c) shows, interference pulses are suppressed to a specific temporal order of magnitude through the combined operation of the first differentiating network and amplifier (A5), as is illustrated for needle pulse (N1). The order of magnitude mentioned results from the time constant of the first differentiating network and the response theshold of amplifier (A5). Should, however, a negative interference pulse appear during transmission of an information pulse, it can evoke a notch or even an interruption in the information pulse, as is shown by needle pulse (N2). The negative needle pulse (N2) is subsequently rendered harmless, however, through the analogous operation of the second differentiating network and amplifier (A6), as is illustrated by comparison of lines (c) to (e).

Since the maximum time duration of interference pulses in electrical supply wiring networks is of a given magnitude (about 300 microseconds), beat frequencies in the range of 50 Hz to 1 kHz recommend themselves for the binary signals.

In accordance with a further feature of the invention, it can be conceived that the recovered signal pulses are to be checked many times in succession to see whether they are present, and that the frequency of their presence may be taken as a basis for a decision as to their authenticity. This could take place, for example, through the use of small test pulses with a higher frequency of repetition, a gate circuit, and a counter. Only when a specific number of checks confirms the presence of a signal pulse can this be identified as authentic and fed in for further processing. This can also take place inside the alarm network (AE) and is not represented here in any greater detail.

Through a presence test of this kind, infrequent interference pulses of greater duration which have passed the interference traps formed by the two differentiating networks can be prevented from being viewed as signal pulses and from producing corresponding disturbances in information. In a preferred configuration of this measure, each bit which has entered the alarm network (AE) is queried as to its static condition by a processor associated with the alarm network about 30 times, and is identified as authentic and passed on only when its presence has been determined at least 20 times.

The measures outlined here for the suppression of interference pulses, both individually and in combination, have brought about a marked improvement in the reliability of data transmission between the alarm networks of a comprehensive alarm system over an interference-ridden electrical supply wiring network over a distance of several hundred meters.

I claim:

1. A method for transmitting binary signals having two logical states over a foreign wiring network, in particular for transmitting signals between the structural elements of an alarm installation over the electrical supply wiring network, wherein at least one of the two logical states of the binary signals is converted into a particular frequency, provided to the foreign network, and selected on a receiving end by filtering devices, said method comprising the steps of:

recovering the binary signals on the receiving end; and passing the recovered binary signals through a first and a second differentiating network having resistors bridged, in each network, by a diode, said diode in said first differentiating network being connected in a direction opposite to that of the diode in the second differentiating network, said first and second differentiating networks operating as an interference trap to identify and block interference pulses.

2. A method according to claim 1, wherein respective amplifiers exhibiting a response threshold are directly connected after each respective one of the two differentiating networks.

3. A method according to any one of claims 1 or 2, wherein the beat frequency of the binary signals lies in the range of 50 Hz to 5 kHz.

4. A method according to any one of claims from 1 or 2, wherein the time constants of the two differentiating networks are chosen in the range between 0.05 and 1.0 milliseconds.

5. A method according to any one of claims 1 or 2, wherein signals arriving as an alternating current frequency are provided to a limiter and are then reconverted into binary data.

6. A method according to claim 3, wherein the time constants of the two differentiating networks are chosen in the range between 0.05 and 1.0 milliseconds.

* * * * *